United States Patent
Xu et al.

(10) Patent No.: US 11,694,530 B2
(45) Date of Patent: Jul. 4, 2023

(54) FIRE-FIGHTING SWITCH DEVICE AND FIRE-FIGHTING SYSTEM

(71) Applicant: CONTEMPORARY AMPEREX TECHNOLOGY CO., LIMITED, Ningde (CN)

(72) Inventors: Xiangxiang Xu, Ningde (CN); Chenling Zheng, Ningde (CN); Yanhua Lu, Ningde (CN); Ying Liu, Ningde (CN); Guojin Zhou, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 38 days.

(21) Appl. No.: 17/505,965

(22) Filed: Oct. 20, 2021

(65) Prior Publication Data
US 2022/0207976 A1 Jun. 30, 2022

Related U.S. Application Data

(63) Continuation of application No. PCT/CN2020/139606, filed on Dec. 25, 2020.

(51) Int. Cl.
*G08B 17/00* (2006.01)
*G08B 17/10* (2006.01)
*H02J 7/00* (2006.01)

(52) U.S. Cl.
CPC ............ *G08B 17/10* (2013.01); *H02J 7/0063* (2013.01)

(58) Field of Classification Search
CPC ........ G08B 17/10; G08B 25/04; G08B 17/06; H02J 7/0063; A62C 3/00
See application file for complete search history.

(56) References Cited

U.S. PATENT DOCUMENTS

| 4,027,302 A | 5/1977 | Healey et al. |
| 8,378,834 B1 * | 2/2013 | Glaub ............... A62C 3/006 169/56 |

(Continued)

FOREIGN PATENT DOCUMENTS

| CN | 206416815 U | 8/2017 |
| CN | 206809567 U | 12/2017 |

(Continued)

OTHER PUBLICATIONS

International Search Report for Application No. PCT/CN2020/139606, dated Sep. 28, 2021, 4 pages.

(Continued)

*Primary Examiner* — Ojiako K Nwugo
(74) *Attorney, Agent, or Firm* — Ladas & Parry LLP

(57) ABSTRACT

Embodiments of this application provide a fire-fighting switch device and a fire-fighting system, which are applied to the field of fire-fighting. The fire-fighting switch device includes a plurality of fire detection switch units, where the fire detection switch unit includes one or more fire detection switches, the one or more fire detection switches form at least one switch path, the fire detection switch is configured to turn on when a fire is detected, and any one of the switch paths is configured to transmit a voltage signal to a fire-extinguishing device when all of the fire detection switches on the switch path are turned on. In this solution, when a fire is detected by one fire detection switch unit, the fire-extinguishing device can be controlled to extinguish the fire provided that all fire detection switches on one switch path in the fire detection switch unit are turned on.

8 Claims, 3 Drawing Sheets

(56) References Cited

U.S. PATENT DOCUMENTS

| | | | | |
|---|---|---|---|---|
| 2008/0017393 | A1* | 1/2008 | Whitney | A62C 35/023 169/90 |
| 2009/0272372 | A1* | 11/2009 | Griffin | A62C 3/006 169/65 |
| 2010/0078184 | A1* | 4/2010 | Pellittiere, II | A62C 31/12 169/51 |
| 2011/0111269 | A1 | 5/2011 | Tse | |
| 2012/0285710 | A1* | 11/2012 | Umehara | G08B 17/00 169/56 |
| 2013/0048319 | A1* | 2/2013 | Glaub | B01D 47/06 169/65 |
| 2013/0062079 | A1* | 3/2013 | Bermes | G05D 16/109 169/19 |
| 2014/0151072 | A1* | 6/2014 | Stehman | A62C 5/006 169/56 |
| 2014/0158382 | A1* | 6/2014 | Ferguson | A62C 37/36 169/61 |
| 2016/0096051 | A1* | 4/2016 | Baker | A62C 37/36 169/46 |
| 2016/0263410 | A1* | 9/2016 | Enk, Sr. | A62C 99/0036 |
| 2016/0296779 | A1* | 10/2016 | Almutairi | A62C 2/12 |
| 2016/0332012 | A1* | 11/2016 | Lenkeit | A62C 37/44 |
| 2016/0356395 | A1* | 12/2016 | Rogala | F16K 27/029 |
| 2017/0293478 | A1* | 10/2017 | Farley | A62C 37/40 |
| 2017/0293630 | A1* | 10/2017 | Farley | G06F 16/1727 |
| 2017/0294092 | A1* | 10/2017 | Farley | H04L 61/5038 |

FOREIGN PATENT DOCUMENTS

| | | |
|---|---|---|
| CN | 208525702 U | 2/2019 |
| CN | 110115815 A | 8/2019 |
| CN | 110975204 A | 4/2020 |
| CN | 211015817 U | 7/2020 |
| CN | 212182484 U | 12/2020 |
| KR | 101881360 B1 | 7/2018 |
| WO | 2018189716 A1 | 10/2018 |

OTHER PUBLICATIONS

Written Opinion of International Search Authority for Application No. PCT/CN2020/139606, dated Sep. 28, 2021, 3 pages.
Partial supplemental European Search Report for Application No. EP20924971.3, dated May 10, 2022, 9 pages.
Extended European Search Report for Application No. EP20924971.3, dated Dec. 19, 2022, 14 pages.

* cited by examiner

FIRE-FIGHTING SWITCH DEVICE AND FIRE-FIGHTING SYSTEM

CROSS-REFERENCE TO RELATED APPLICATIONS

This application is a continuation of International Patent Application No. PCT/CN2020/139606 filed on Dec. 25, 2020, the disclosure of which is incorporated herein by reference in its entirety.

TECHNICAL FIELD

This application relates to the field of battery technologies, and in particular, to a fire-fighting switch device and a fire-fighting system.

BACKGROUND

In an existing electrical layout, a fire controller makes judgments by collecting signals from a smoke detector and a heat detector. When a smoke alarm and a heat alarm simultaneously occur, the fire controller works with a fire-extinguishing apparatus to extinguish a fire.

In general design, for a system with multiple battery cabinets, to receive a signal from each smoke detector or temperature detector, a fire controller needs to use a code addressing scheme to obtain location of the detector, which makes the fire-fighting system highly complex.

SUMMARY

Embodiments of this application are intended to provide a fire-fighting switch device and a fire-fighting system to resolve the technical problem of high complexity of fire-fighting systems.

To achieve the foregoing objectives, technical solutions provided in the embodiments of this application are as follows:

According to a first aspect, an embodiment of this application provides a fire-fighting switch device, including: a plurality of fire detection switch units, where the fire detection switch unit includes one or more fire detection switches, the one or more fire detection switches form at least one switch path, and the fire detection switch is configured to turn on when a fire is detected, where any one of the switch paths is configured to transmit a voltage signal to a fire-extinguishing device when all of the fire detection switches on the switch path are turned on. In the foregoing solution, when a fire is detected by one fire detection switch unit, the fire-extinguishing device can be controlled to extinguish the fire provided that all fire detection switches on one switch path in the fire detection switch unit are turned on. Therefore, code addressing is unnecessary for determining where an anomaly has occurred, thereby reducing computation and making the fire-fighting switch device work with less complexity.

In an optional embodiment of this application, the fire detection switch includes a first relay and a sensor assembly, and the sensor assembly is configured to control the first relay to turn on when a fire is detected, so as to turn on the fire detection switch. In the foregoing solution, the sensor assembly and the first relay cooperate to implement an addressing function, which not only makes the fire-fighting switch device work with less complexity, but also reduces costs of the fire-fighting switch device. The use of relay control is more reliable and time-efficient than the way of logic judgments by a host.

In an optional embodiment of this application, the first relays of the plurality of fire detection switches are connected in series to form one switch path, and the sensor assemblies of the plurality of fire detection switches that are sequentially connected are sensor assemblies of different types. In the foregoing solution, corresponding first relays can be turned on, that is, a corresponding switch path can be turned on, only when a plurality of sensor assemblies of different types all detect a fire. Therefore, possibility of the fire-extinguishing device being touched by mistake can be reduced.

In an optional embodiment of this application, the plurality of fire detection switches form a plurality of switch paths, and the sensor assemblies of the plurality of fire detection switches are sensor assemblies of a same type, and the first relays of the plurality of fire detection switches are connected in parallel to form the plurality of switch paths. In the foregoing solution, when a fire is detected by one of the plurality of sensor assemblies of the same type, a corresponding first relay is turned on and a corresponding switch path is turned on. Therefore, possibility of false negatives given by the sensor assemblies can be reduced.

In an optional embodiment of this application, the plurality of fire detection switches form a plurality of switch paths; the plurality of fire detection switches include at least two types of fire detection switches, and different types of fire detection switches are provided with different types of sensor assemblies; and first relays of fire detection switches of a same type in the plurality of fire detection switches are connected in parallel and first relays of fire detection switches of different types in the plurality of fire detection switches are connected in series, to form the plurality of switch paths. In the foregoing solution, when a plurality of sensor assemblies of different types on a switch path all detect a fire, the corresponding switch path is turned on, thus reducing both possibility of touching the fire-extinguishing device by mistake and possibility of false negatives given by the sensor assembly.

In an optional embodiment of this application, the sensor assembly is a smoke sensor, a temperature sensor, or an infrared sensor. In the foregoing solution, various types of sensor assemblies can be selected depending on actual conditions of the electrical device, so as to ensure fire distinguishing accuracy of the fire-fighting switch device.

In an optional embodiment of this application, the fire-fighting switch device further includes: a power supply interface assembly, and the power supply interface assembly includes: a first interface configured to provide the voltage signal to the first relays of the fire detection switches; and a second interface configured to supply power to the sensor assemblies of the fire detection switches.

According to a second aspect, an embodiment of this application provides a fire-fighting system, including the fire-fighting switch device according to the first aspect and a battery management unit, where the fire detection switch further includes a second relay connected to the battery management unit; a sensor assembly is further configured to control the second relay to turn on when a fire is detected; and the battery management unit is further connected to a battery in an electrical device and configured to control the battery in the electrical device to stop supplying power when the second relay is detected to have been turned on. In the foregoing solution, when the sensor assembly of the fire-fighting switch device detects a fire, the corresponding second relay is turned on, and by monitoring the state of the second relay in real time, the battery management unit can control the battery to stop supplying power when the second relay is turned on.

In an optional embodiment of this application, the fire-fighting system further includes the fire-extinguishing device, where the fire-extinguishing device includes a fire-extinguishing assembly and a third relay, and the third relay is connected to the battery management unit; and the battery management unit is further configured to control the battery in the electrical device to stop supplying power when the third relay is detected to have been turned on. In the foregoing solution, when the fire-extinguishing assembly in the fire-extinguishing device is working, the corresponding third relay is turned on, and by monitoring the state of the third relay in real time, the battery management unit can control the battery to stop supplying power when the third relay is turned on.

In an optional embodiment of this application, the battery management unit is further configured to give an alarm when the second relay is turned on or when the third relay is turned on. In the foregoing solution, when the second relay or the third relay is turned on, the battery management unit can give an alarm to remind management personnel that the electrical device is having a fire.

In an optional embodiment of this application, the fire-extinguishing device includes an aerosol generator.

To make the foregoing objectives, features, and advantages of this application more obvious and understandable, the following embodiments of this application are described in detail with reference to the accompanying drawings.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may still derive other drawings from these accompanying drawings without creative efforts.

Figure 1:
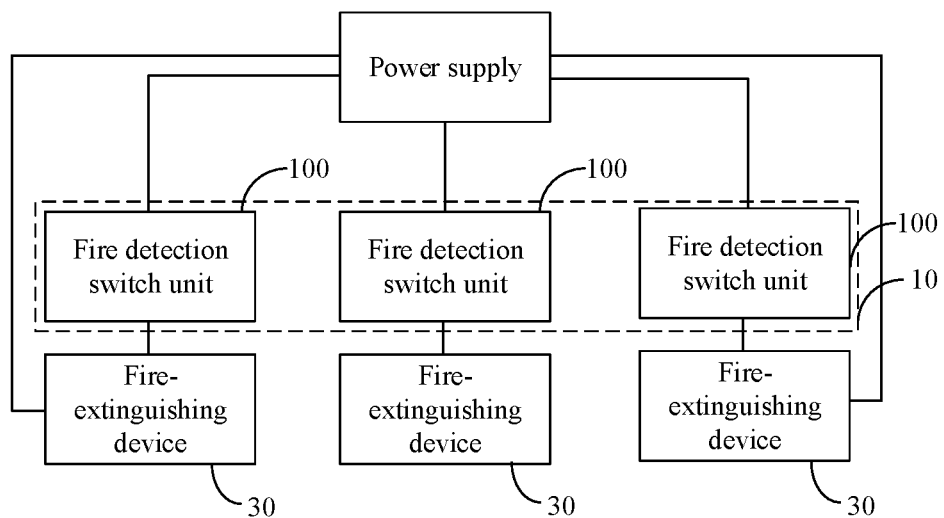
FIG. 1 is a schematic structural diagram of a fire-fighting switch device according to an embodiment of this application.

In the accompanying drawings, the drawings are not drawn to scale.

Reference signs are described as follows: 10. fire-fighting switch device; 100. fire detection switch unit; 110. fire detection switch; 111. first relay; 112. sensor assembly; 113. second relay; 30. fire-extinguishing device; 301. third relay; 302. fire-extinguishing assembly; and 40. battery management unit.

DESCRIPTION OF EMBODIMENTS

Embodiments of this application may be described in further detail below with reference to the accompanying drawings and the embodiments. The detailed description of the following embodiments and the accompanying drawings are used to exemplarily illustrate the principle of this application, but are not intended to limit the scope of this application. In other words, this application is not limited to the described embodiments.

In the descriptions of this application, it should be noted that, unless otherwise specified, "plurality" means more than two; and orientations or position relationships indicated by the terms "up", "down", "left", "right", "inside", "outside", and the like are merely intended to simplify description of this application for the purpose of easy description, without indicating or implying that an apparatus or element referred to must have a particular direction or must be constructed and operated in a particular orientation. Therefore, these terms shall not be construed as any limitation on this application. In addition, the terms "first", "second", and "third" are merely intended for the purpose of description, and shall not be understood as any indication or implication of relative importance. "Perpendicular" is not perpendicular in the strict sense, but within an allowable range of error. "Parallel" is not parallel in the strict sense, but within an allowable range of error.

The orientation terms given in the following descriptions all refer to directions shown in the drawings, and are not intended to limit the specific structure of this application. In the descriptions of this application, it should be further noted that, unless otherwise specified and defined explicitly, the terms "mounted", "interconnected", and "connected" are to be interpreted broadly, for example, may be fixedly connected, or detachably connected, or integrally connected, and may be directly connected, or indirectly connected through an intermediate medium. Persons of ordinary skill in the art can understand specific meanings of these terms in this application as appropriate for specific situations.

FIG. 1 is a schematic structural diagram of a fire-fighting switch device according to an embodiment of this application. The fire-fighting switch device 10 may include a plurality of fire detection switch units 100, where the fire detection switch unit 100 includes one or more fire detection switches 110, the one or more fire detection switches 110 form at least one switch path, the fire detection switch 110 is configured to turn on when a fire is detected, and any one of the switch paths is configured to transmit a voltage signal to a fire-extinguishing device 30 when all of the fire detection switches 110 on the switch path are turned on.

Only three fire detection switch units 100 are shown in FIG. 1. It can be understood that the number of the fire detection switch units 100 in the fire-fighting switch device 10 is not limited to three, and those skilled in the art can make adjustments based on actual situations.

Specifically, an electrical device that requires fire monitoring is used as an example, and the electrical device may be a device that needs electricity such as a battery cabinet, a voltage box, or the like. An electrical layout generally includes a plurality of electrical devices, which means that fire monitoring is required for all the plurality of electrical devices. In an embodiment of this application, each of the electrical devices is provided with one fire detection switch unit 100. One end of fire detection switch unit 100 is connected to a power supply, and the other end is connected to the fire-extinguishing device 30. When one switch path in the fire detection switch unit 100 is turned on, the fire-extinguishing device 30 starts to work.

The fire detection switch units 100 being connected in parallel allow separate control on each electrical device, and a fire-fighting action in one electrical device does not affect normal operation of other electrical devices and the fire detection switch units 100 in the electrical devices.

It can be understood that the fire detection switch units 100 may be provided either entirely or partially in the electrical device. For example, if the fire detection switch unit 100 includes a relay and a sensor assembly 112, the sensor assembly 112 can be provided in the electrical device, and the relay can be provided outside the electrical device. This is not particularly limited in the embodiments of this application.

In addition, in addition to electrical devices, the fire-fighting switch device according to this embodiment of this application can be applied to any area where fire monitoring is required. For example, the fire-fighting switch device can be applied to warehouses where inflammables are stored and high-temperature work plants. This is not particularly limited in the embodiments of this application.

Each of the fire detection switch units 100 may include one or more fire detection switches 110. In one implementation, the fire detection switch 110 may include a relay (named as a first relay 111 for ease of description) and a sensor assembly 112. The first relay 111 may be disposed on a base of the sensor assembly 112 to jointly form one fire detection switch 110. When detecting a fire, the sensor assembly 112 can control the first relay 111 on the base to turn on. At this point, it can be considered that the corresponding fire detection switch 110 is turned on.

It can be understood that in the foregoing embodiments, various types of sensor assemblies 112 are available for choice, for example, smoke sensors, temperature sensors, or infrared sensors. This is not particularly limited in the embodiments of this application, and those skilled in the art can select an appropriate sensor assembly 112 based on an actual situation of the area where fire monitoring is required, so as to ensure fire-extinguishing accuracy of the fire-fighting switch device 10. The sensor assembly 112 including a smoke sensor and a temperature sensor is used as an example. The fire detection switch 110 can be implemented by selecting a 45681-256 series base with smoke and temperature sensors.

In this implementation, the fire-fighting switch device 10 according to the embodiments of this application may further include a power supply interface assembly, where the power supply interface assembly includes: a first interface configured to provide the voltage signal to the first relay 111 of the fire detection switch 110; and a second interface configured to supply power to the sensor assembly of the fire detection switch 110.

It should be noted that the foregoing implementation of the fire detection switch 110 is only an example provided in the embodiments of this application. For example, the relay in the fire detection switch 110 may use other elements providing a switching function, for example, a single-pole double-throw switch; and the sensor assembly 112 in the fire detection switch 110 may be a device with a communication function to receive fire information sent by an external device. This is not particularly limited in the embodiments of this application, and those skilled in the art can make appropriate adjustments based on actual conditions in combination with conventional technical means in the field.

In addition, the embodiments of this application do not specifically limit the number of elements in the fire detection switch 110. For example, one fire detection switch 110 may include a plurality of relays or a plurality of sensor assemblies 112.

In an implementation, if each of the fire detection switch units 100 includes only one fire detection switch 110, the fire detection switch 110 forms a separate switch path, and therefore the voltage signal is transmitted to the fire-extinguishing device 30 to extinguish the fire when the fire detection switch 110 is turned on.

Figure 2:
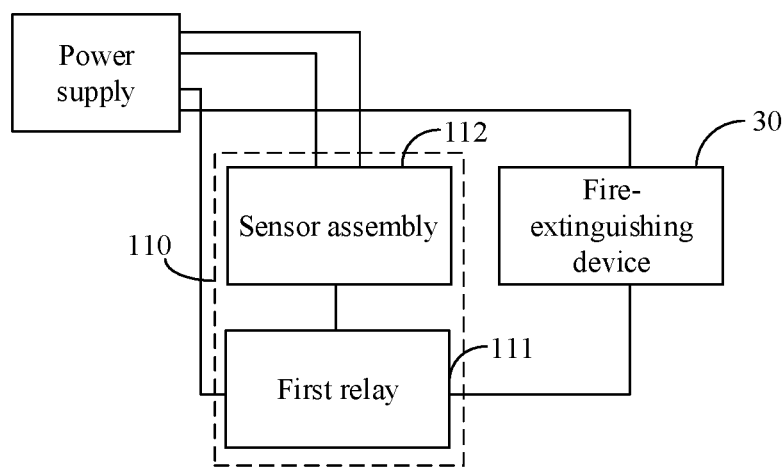
FIG. 2 is a schematic structural diagram of another fire-fighting switch device according to an embodiment of this application.

The fire detection switch 110 including a first relay 111 and a sensor assembly 112 is used as an example. FIG. 2 is a schematic structural diagram of another fire-fighting switch device according to an embodiment of this application. In the fire-fighting switch device 10, if the fire-fighting switch device is applied to electrical devices, in each electrical device, the sensor assembly 112 in the fire detection switch 110 is connected to a power supply, one end of the first relay 111 in the fire detection switch 110 is connected to the power supply, and the other end of the first relay 111 is connected to the fire-extinguishing device 30. When the sensor assembly 112 detects a fire, the first relay 111 is closed, and the fire-extinguishing device 30 starts to work.

The first relay 111, the fire-extinguishing device 30, and the power supply form a switch path.

It can be understood that FIG. 2 only shows an implementation of the fire-fighting switch device 10 in one electrical device. When there are a plurality of electrical devices, the fire-fighting switch device 10 in each electrical device can be implemented in the way shown in FIG. 2.

In another implementation, if each of the fire detection switch units 100 includes a plurality of fire detection switches 110, the plurality of fire detection switches 110 form at least one switch path. In this case, the fire detection switch 110 including a first relay 111 and a sensor assembly 112 is used as an example. There are various cases of connection relationships in each fire detection switch unit 100.

In a first case, the first relays 111 of the plurality of fire detection switches 110 are connected in series to form one switch path, and the sensor assemblies 112 of the plurality of fire detection switches 110 that are sequentially connected are sensor assemblies of different types.

In a second case, the first relays 111 of the plurality of fire detection switches 110 are connected in parallel to form a plurality of switch paths, and the sensor assemblies 112 of the plurality of fire detection switches 110 are sensor assemblies 112 of a same type.

In a third case, the plurality of fire detection switches 110 include at least two types of fire detection switches 110, and different types of fire detection switches 110 are provided with different types of sensor assemblies 112. First relays 111 of fire detection switches 110 of a same type in the plurality of fire detection switches 110 are connected in parallel and first relays 111 of fire detection switches 110 of different types in the plurality of fire detection switches 110 are connected in series, to form a plurality of switch paths.

The foregoing three cases are described in detail below in turn.

Figure 3:
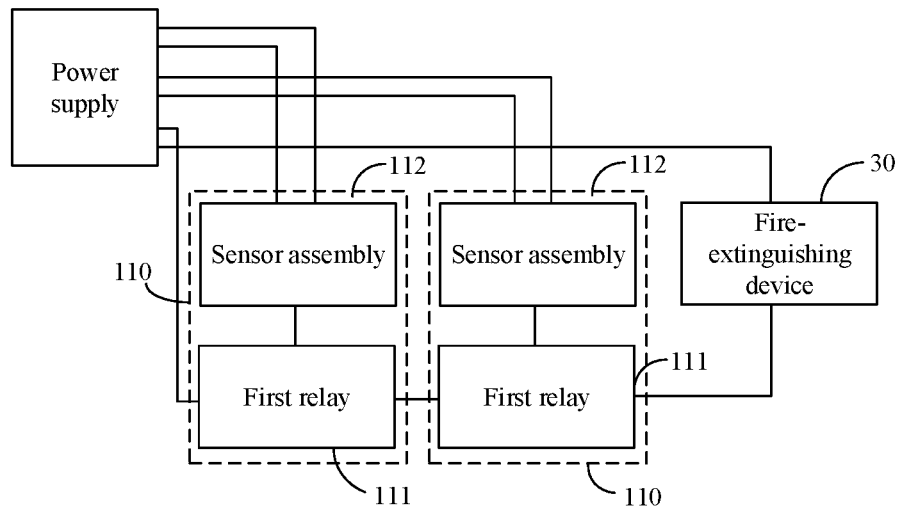
FIG. 3 is a schematic structural diagram of a fire-fighting switch device in a first case according to an embodiment of this application.

FIG. 3 is a schematic structural diagram of a fire-fighting switch device in the first case according to an embodiment of this application. In view of the foregoing first case, in each fire detection switch unit 100, the first relays 111 in the plurality of fire detection switches 110 are connected in series to form one switch path, and each of the first relays 111 corresponds to one sensor assembly 112. Each of the sensor assemblies 112 is of a different type, and therefore the formed switch path can be turned on and the fire-extinguishing device 30 can start to work only when all of the sensor assemblies 112 detect a fire.

For example, one fire detection switch unit 100 includes one smoke sensor, one temperature sensor, and first relays 111 corresponding to the two sensors. The power supply, two first relays 111, and the fire-extinguishing device 30 form one switch path. If only the smoke sensor detects heavy smoke in an area that requires fire monitoring or only the temperature sensor detects an abnormal temperature rise in the area that requires fire monitoring, the switch path will not turn on and the fire-extinguishing device 30 will not start to work because only one first relay 111 is turned on; and if the smoke sensor detects heavy smoke in the area that requires fire monitoring and the temperature sensor detects an abnormal temperature rise in the area that requires fire monitoring, the switch path is turned on and the fire-extinguishing device 30 starts to work because the two first relays 111 are both closed.

Therefore, in the embodiments of this application, employing the foregoing first case can reduce possibility of touching the fire-extinguishing device 30 by mistake.

Figure 4:
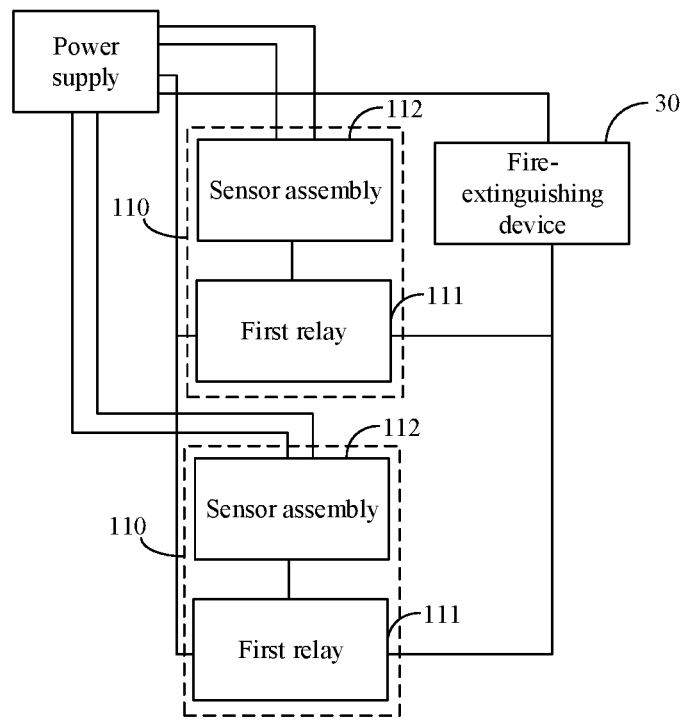
FIG. 4 is a schematic structural diagram of a fire-fighting switch device in a second case according to an embodiment of this application.

FIG. 4 is a schematic structural diagram of a fire-fighting switch device in the second case according to an embodiment of this application. In view of the foregoing second case, in each of the fire detection switch units 100, the first relays 111 of the plurality of fire detection switches 110 are connected in parallel to form a plurality of switch paths, and each of the first relays 111 corresponds to one sensor assembly 112. The power supply, one first relay 111, and the fire-extinguishing device 30 form one switch path. All of the sensor assemblies 112 are of the same type. Therefore, when one sensor assembly 112 in the plurality of sensor assemblies 112 detects a fire, a corresponding switch path is turned on, and the fire-extinguishing device 30 can start to work.

For example, one fire detection switch unit 100 includes two smoke sensors and first relays 111 corresponding to the two sensors. If one of the smoke sensors detects heavy smoke in an area that requires fire monitoring, a first relay 111 corresponding to that smoke sensor is turned on, and therefore a switch path corresponding to the first relay 111 is turned on, and the fire-extinguishing device 30 starts to work.

If the fire-fighting switch device is applied to an electrical device, a plurality of sensor assemblies 112 of a same type can be provided in different areas of the electrical device, so that the electrical device can be monitored in multiple areas. Therefore, in this embodiment of this application, employing the foregoing second case can reduce possibility of false negatives given by the sensor assemblies 112.

The foregoing third case can be considered as a combination of the first case and the second case, where each of the fire detection switch units 100 includes a plurality of switch paths, and the first case is applied on each switch path, that is, first relays 111 of fire detection switches 110 of different types are connected in series; while the second case is applied across a plurality of switch paths, that is, first relays 111 of fire detection switches 110 of a same type in the plurality of fire detection switches 110 are connected in parallel.

Therefore, the third case are not further described in the embodiments of this application, and those skilled in the art can implement the third case according to the implementations of the first case and the second case. It can be understood that in the embodiments of this application, employing the third case can reduce both possibility of touching the fire-extinguishing device 30 by mistake and possibility of false negatives given by the sensor assemblies 112.

In the embodiments of this application, if the fire-fighting switch device is applied to electrical devices, when a fire is detected in one electrical device, the fire-extinguishing device 30 can be controlled to extinguish the fire provided that all fire detection switches 110 on one switch path in the electrical device are turned on, thereby reducing computation and making the fire-fighting switch device 10 work with less complexity. In addition, the sensor assembly 112 and the first relay 111 cooperate to implement an addressing function, which reduces costs of the fire-fighting switch device 10 while making the fire-fighting switch device 10 work with less complexity. The use of relay control is more reliable and time-efficient than the way of logic judgments by a host.

Figure 5:
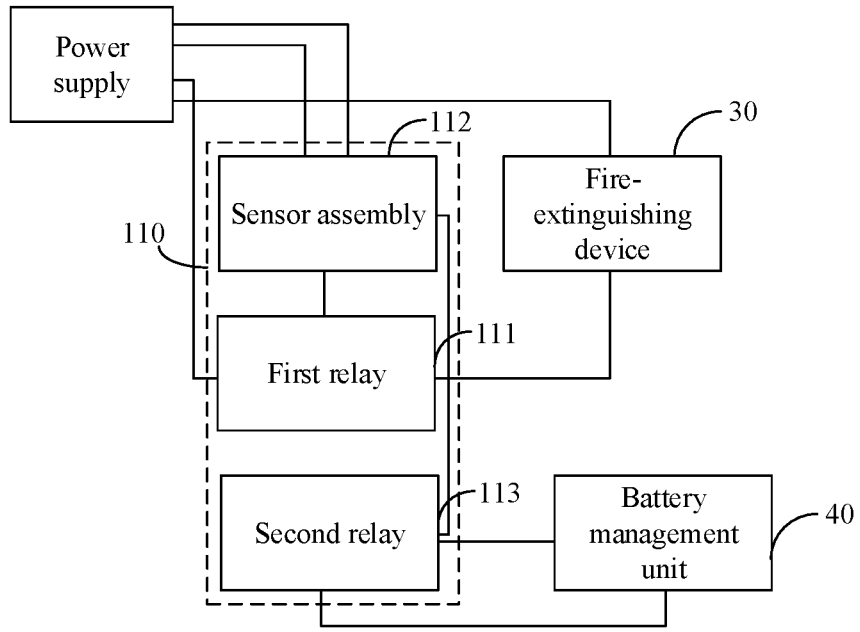
FIG. 5 is a schematic structural diagram of a fire-fighting system according to an embodiment of this application.

FIG. 5 is a schematic structural diagram of a fire-fighting system according to an embodiment of this application. The fire-fighting system may include the fire-fighting switch device 10 in the foregoing embodiments and a battery management unit 40; the fire detection switch 110 further includes a second relay 113 connected to the battery management unit 40; the sensor assembly 112 is further configured to control the second relay 113 to turn on when detecting a fire; and the battery management unit 40 is further connected to a battery in an electrical device and configured to control the battery in the electrical device to stop supplying power when the second relay 113 is detected to have been turned on.

FIG. 5 shows a case where only one fire detection switch unit 100 is included in the fire-fighting switch device 10.

Specifically, on the basis of including a first relay 111 and a sensor assembly 112, the fire detection switch 110 may further include a second relay 113. The second relay 113, similar to the first relay 111, may be disposed on the base of the sensor assembly 112, and the first relay 111, the second relay 113, and the sensor assembly 112 together form one fire detection switch 110. When detecting a fire, the sensor assembly 112 can control both the first relay 111 and the second relay 113 on the base to turn on.

The second relay 113 may be connected to the battery management unit 40, and the battery management unit 40 may detect whether the second relay 113 is turned on or not. When the second relay 113 is turned on, the battery management unit 40 may consider that the sensor assembly 112 corresponding to the second relay 113 has detected a fire. When detecting that the second relays 113 corresponding to all of the first relays 111 on one switch path are turned on or the second relay 113 corresponding to one first relay 111 is turned on, the battery management unit 40 may consider that the electrical device is having a fire. At this point, the battery management unit 40 may control the battery in the electrical device to stop supplying power and perform operations such as alarming.

It can be understood that, for different cases in the foregoing embodiments, the battery management unit 40 considers that a fire has occurred in the electrical device when a corresponding second relay 113 is detected to have been turned on. In an example, each of the fire detection switch units 100 includes a plurality of fire detection switches 110 and the first case in the foregoing embodiments is employed. The battery management unit 40 considers that a fire has occurred in the electrical device when detecting that all of the second relays 113 corresponding to the first relays 111 that are connected in series are closed.

Therefore, when a sensor assembly 112 of the fire-fighting switch device 10 detects a fire, a corresponding second relay 113 is turned on, and by monitoring the state of the second relay 113 in real time, the battery management unit 40 can control the battery to stop supplying power when the second relay 113 is turned on.

Figure 6:
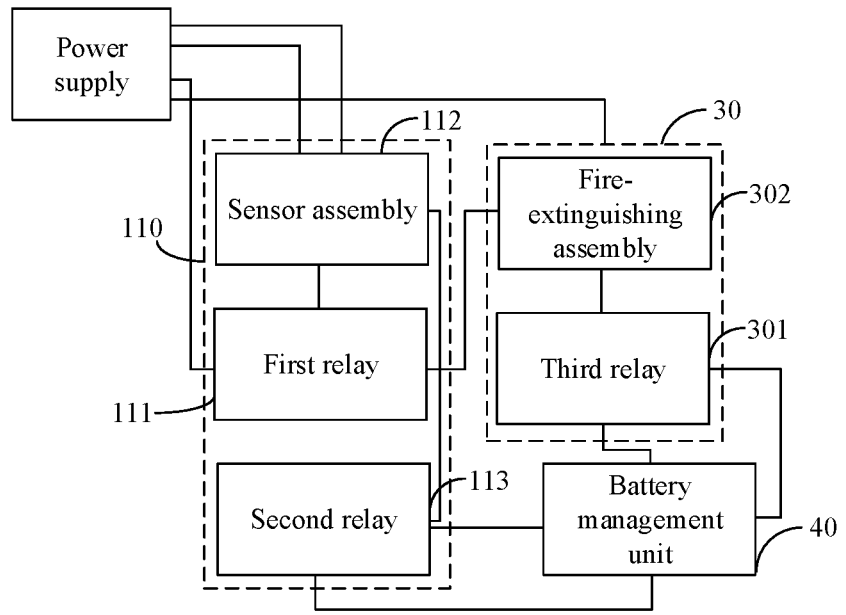
FIG. 6 is a schematic structural diagram of another fire-fighting system according to an embodiment of this application.

Further, FIG. 6 is a schematic structural diagram of another fire-fighting system according to an embodiment of this application. On the basis of the foregoing embodiments, the fire-fighting system may further include a fire-extinguishing device 30, where the fire-extinguishing device 30 includes a fire-extinguishing assembly 302 and a third relay 301, the third relay 301 is connected to the battery management unit 40, and the battery management unit 40 is further configured to control a battery in an electrical device to stop supplying power when the third relay 301 is detected to have been turned on.

FIG. 6 also shows a case where only one fire detection switch unit 100 is included in the fire-fighting switch device 10.

Specifically, the fire-extinguishing assembly 302 in the fire-extinguishing device 30 is connected to a power supply, and the fire-extinguishing device 30 may further include a relay (named as the third relay 301 for ease of description). The third relay 301, similar to the second relay 113, may be disposed on a base of the fire-extinguishing assembly 302, and the third relay 301 and the sensor assembly 112 together form the fire-extinguishing device 30. When the fire-extinguishing assembly 302 in the fire-extinguishing device 30 starts to work, the third relay 301 on the base may be controlled to turn on. In an implementation, the fire-extinguishing device 30 may include an aerosol generator.

The third relay 301 may be connected to the battery management unit 40, and the battery management unit 40 may detect whether the third relay 301 is turned on or not. When a third relay is turned on, the battery management unit 40 may consider that a fire-extinguishing assembly 302 corresponding to the third relay 301 starts to work, which means that a fire has occurred in the electrical device. In this case, the battery management unit 40 may control a battery in the electrical device to stop supplying power and perform operations such as alarming.

Therefore, when a fire-extinguishing assembly 302 in the fire-extinguishing device 30 is working, a corresponding third relay 301 is turned on, and by monitoring the state of the third relay in real time, the battery management unit 40 can give an alarm when the third relay 301 is turned on.

In an implementation, the fire-fighting system according to the embodiments of this application can be applied to various battery energy storage systems. For example, for a container-type energy storage system, the fire-fighting switch device 10 may be configured in a control unit of a container battery system; and for a station-type energy storage system or an outdoor electric cabinet energy storage system, the fire-fighting switch device 10 may be configured in a main control cabinet of the energy storage system.

Although this application has been described with reference to some preferred embodiments, various modifications can be made without departing from the scope of this application and the elements therein can be replaced with equivalents. In particular, the technical features mentioned in the embodiments can be combined in any manner provided that no structural conflict is introduced. This application is not limited to the specific embodiments disclosed in the specification, but includes all technical solutions falling within the scope of the claims.

What is claimed is:

1. A fire-fighting switch device, comprising a fire detection switch unit, wherein
the fire detection switch unit comprises a plurality of fire detection switches, the plurality of fire detection switches form at least one switch path, and the fire detection switches are configured to turn on when a fire is detected;
wherein any one of the switch paths is configured to transmit a voltage signal to a fire-extinguishing device when all of the fire detection switches on the switch path are turned on;
wherein each fire detection switch comprises a first relay and a sensor assembly, and the sensor assembly is configured to control the first relay to turn on when the fire is detected; and
wherein the sensor assembly comprises a smoke sensor, a temperature sensor, or an infrared sensor.

2. The fire-fighting switch device according to claim 1, wherein first relays of the plurality of fire detection switches are connected in series to form one switch path; and
sensor assemblies of the plurality of fire detection switches are connected in series, and the sensor assemblies are of different types.

3. The fire-fighting switch device according to claim 1, wherein
the plurality of fire detection switches form a plurality of switch paths;
sensor assemblies of the plurality of fire detection switches are sensor assemblies of a same type; and
first relays of the plurality of fire detection switches are connected in parallel to form the plurality of switch paths.

4. The fire-fighting switch device according to claim 1, wherein
the plurality of fire detection switches form a plurality of switch paths;
the plurality of fire detection switches comprise at least two types of fire detection switches, and different types of fire detection switches are provided with different types of sensor assemblies; and
first relays of fire detection switches of a same type in the plurality of fire detection switches are connected in parallel, and first relays of fire detection switches of different types in the plurality of fire detection switches are connected in series, to form the plurality of switch paths.

5. The fire-fighting switch device according to claim 1, further comprising a power supply interface assembly, wherein the power supply interface assembly comprises:
a first interface, configured to provide the voltage signal to first relays of the plurality of fire detection switches; and
a second interface, configured to supply power to sensor assemblies of the plurality of fire detection switches.

6. A fire-fighting system, comprising the fire-fighting switch device according to claim 1 and a battery management unit, wherein
each fire detection switch further comprises a second relay connected to the battery management unit;
each sensor assembly of the fire detection switch is further configured to control the second relay to turn on when the fire is detected; and
the battery management unit is further connected to a battery in an electrical device and configured to control the battery in the electrical device to stop supplying power when the second relay is turned on.

7. The fire-fighting system according to claim 6, wherein the fire-fighting system further comprises a fire-extinguishing device, wherein the fire-extinguishing device comprises a fire-extinguishing assembly and a third relay, and the third relay is connected to the battery management unit; and the battery management unit is further configured to control the battery in the electrical device to stop supplying power when the third relay is detected to have been turned on.

8. The fire-fighting system according to claim 7, wherein the battery management unit is further configured to give an alarm when the second relay is turned on or when the third relay is turned on.

\* \* \* \* \*